(12) United States Patent
Covell et al.

(10) Patent No.: US 6,701,622 B2
(45) Date of Patent: Mar. 9, 2004

(54) HANDLE MOUNTING ARRANGEMENT FOR A POWER TOOL

(75) Inventors: Kevin W. Covell, Freeland, MD (US); John Vantran, Parkton, MD (US); Robert P. Wagster, Baltimore, MD (US); Calvin M. Edleblute, Stewartstown, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/977,014

(22) Filed: Oct. 12, 2001

(65) Prior Publication Data

US 2002/0152618 A1 Oct. 24, 2002

Related U.S. Application Data

(60) Provisional application No. 60/285,129, filed on Apr. 20, 2001.

(51) Int. Cl.$^7$ .............................................. B26B 15/00
(52) U.S. Cl. ........................ 30/216; 30/210; 30/232; 30/298
(58) Field of Search ..................... 30/210, 216, 228, 30/231, 232, 369, 382, 383, 296.1, 298, 312, 340, 344; D8/8

(56) References Cited

U.S. PATENT DOCUMENTS

| 3,552,015 | A | | 1/1971 | Batson ........................ 30/216 |
| 4,856,195 | A | | 8/1989 | Grossmann et al. .......... 30/369 |
| 5,150,523 | A | | 9/1992 | McCurry ..................... 30/228 |
| 5,687,483 | A | * | 11/1997 | Neubert et al. ............... 30/312 |
| 6,018,939 | A | | 2/2000 | Nagashima .................. 56/237 |

* cited by examiner

Primary Examiner—Hwei-Siu Payer
(74) Attorney, Agent, or Firm—Harness, Dickey & Pierce, P.L.C.

(57) ABSTRACT

An arrangement for mounting a handle to a power tool housing includes a first mounting portion defined by the housing and a second mounting portion defined by an end of the handle. The first mounting portion includes a plurality of projections extending laterally therefrom. The second mounting portion includes a plurality of recesses adapted to receive the plurality of lateral projections

24 Claims, 5 Drawing Sheets

HANDLE MOUNTING ARRANGEMENT FOR A POWER TOOL

CROSS-REFERENCE TO RELATED APPLICATION

This invention relates to U.S. Provisional Application No. 60/285,129, filed Apr. 20, 2001.

FIELD OF THE INVENTION

The present invention relates to hand-held power tools and more specifically to a handle mounting arrangement for a power tool.

BACKGROUND OF THE INVENTION

Hand-held power tools such as hedge trimmers, chain saws and the like, are generally provided with a bail handle attached to and extending from a motor housing. The bail handle is commonly located between a rear handle and the cutting portion. For example, a conventional arrangement includes a combined bail and top handle extending over and spaced above the top of the motor housing of the power tool.

A power hedge trimmer may be provided with a handle in the shape of an inverted U which forms a top handle and opposite side handles. In such an arrangement, the handle is commonly fastened on opposite ends to the housing with a single screw passing through the housing. In some cases, with continued use, the vibrational forces associated with a power tool may influence the handle to rotate relative to the housing about the fasteners.

While known handle attachment configurations are satisfactory for their intended purpose, it remains desirable in the pertinent art to provide a handle arrangement for a power tool which includes a structure able to resist relative rotation of the handle about the housing.

SUMMARY OF THE INVENTION

It is a general object of the present invention to provide an arrangement for mounting a bail handle to a power tool. In one form, the present invention provides a power tool having a housing including a first mounting portion with a plurality of projections extending laterally therefrom. The arrangement further includes a bail handle having a second mounting portion including a plurality of recesses adapted to receive the plurality of lateral projections.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
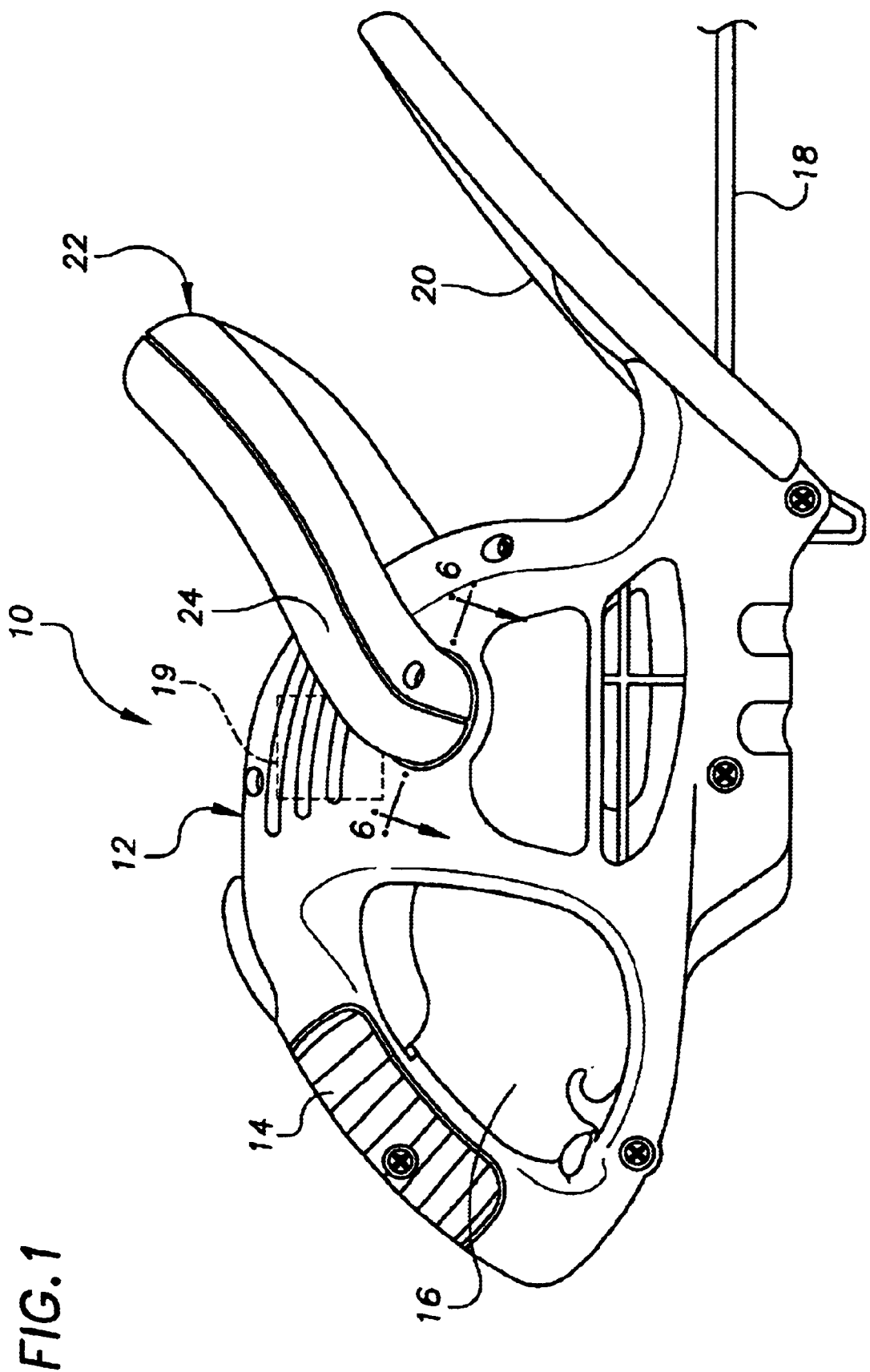
FIG. 1 is a side view of a power tool constructed to include a handle mounting arrangement in accordance with the teachings of a preferred embodiment of the present invention.
Figure 2:
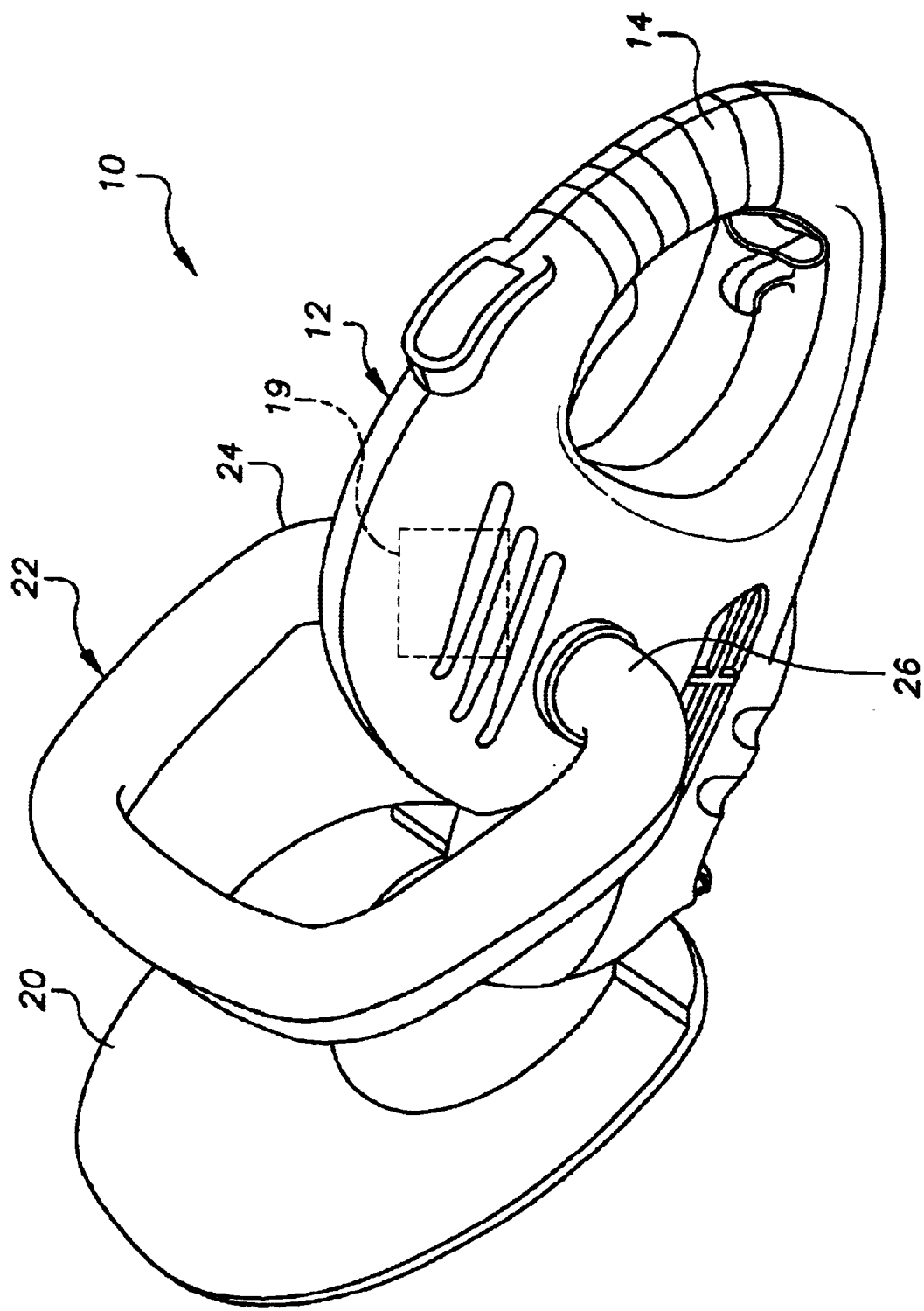
FIG. 2 is a perspective view of the power tool of FIG. 1.
Figure 3:
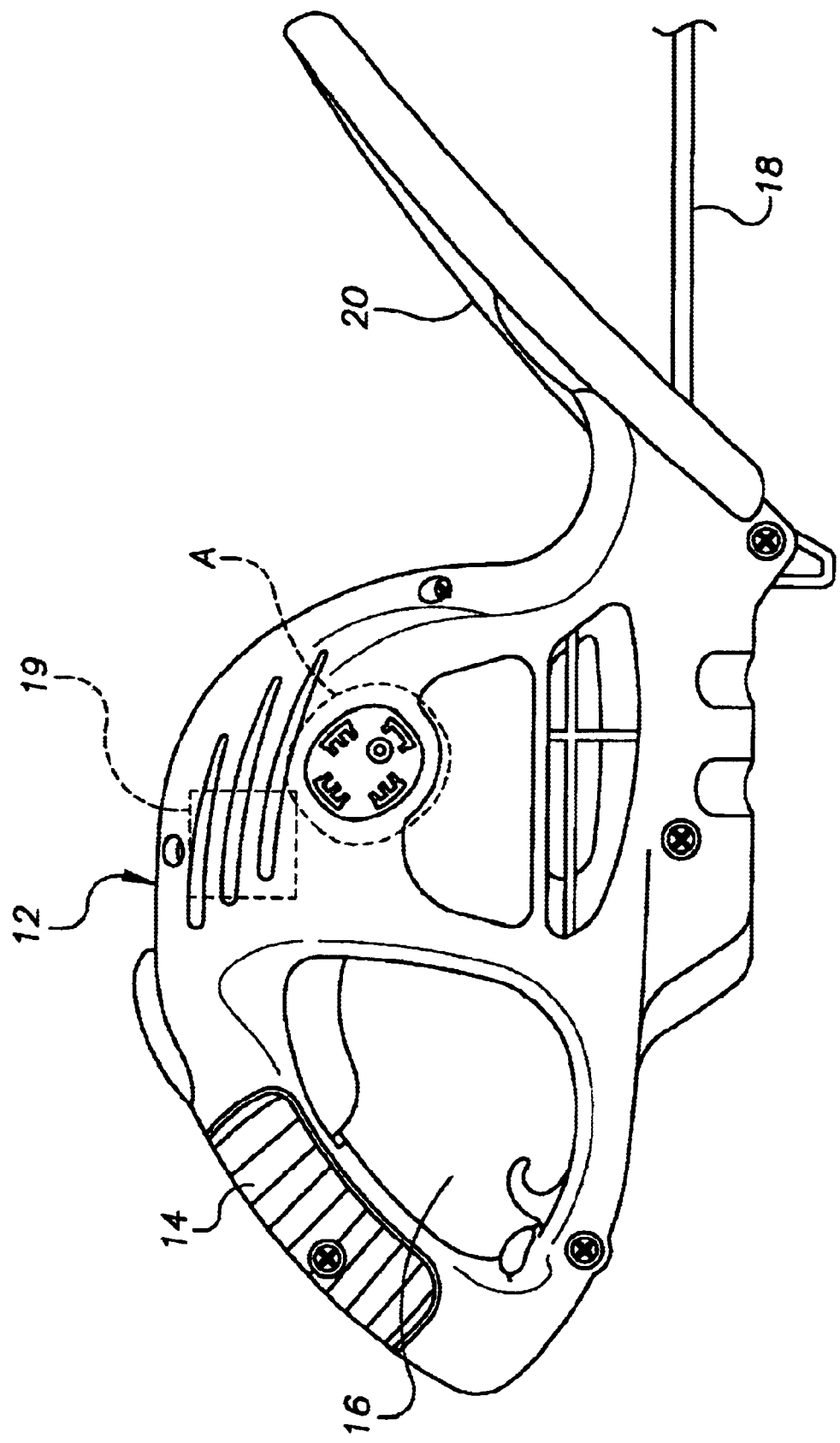
FIG. 3 is a side view of the power tool of FIG. 1 shown with the bail handle removed for purposes of illustration.
Figure 4:
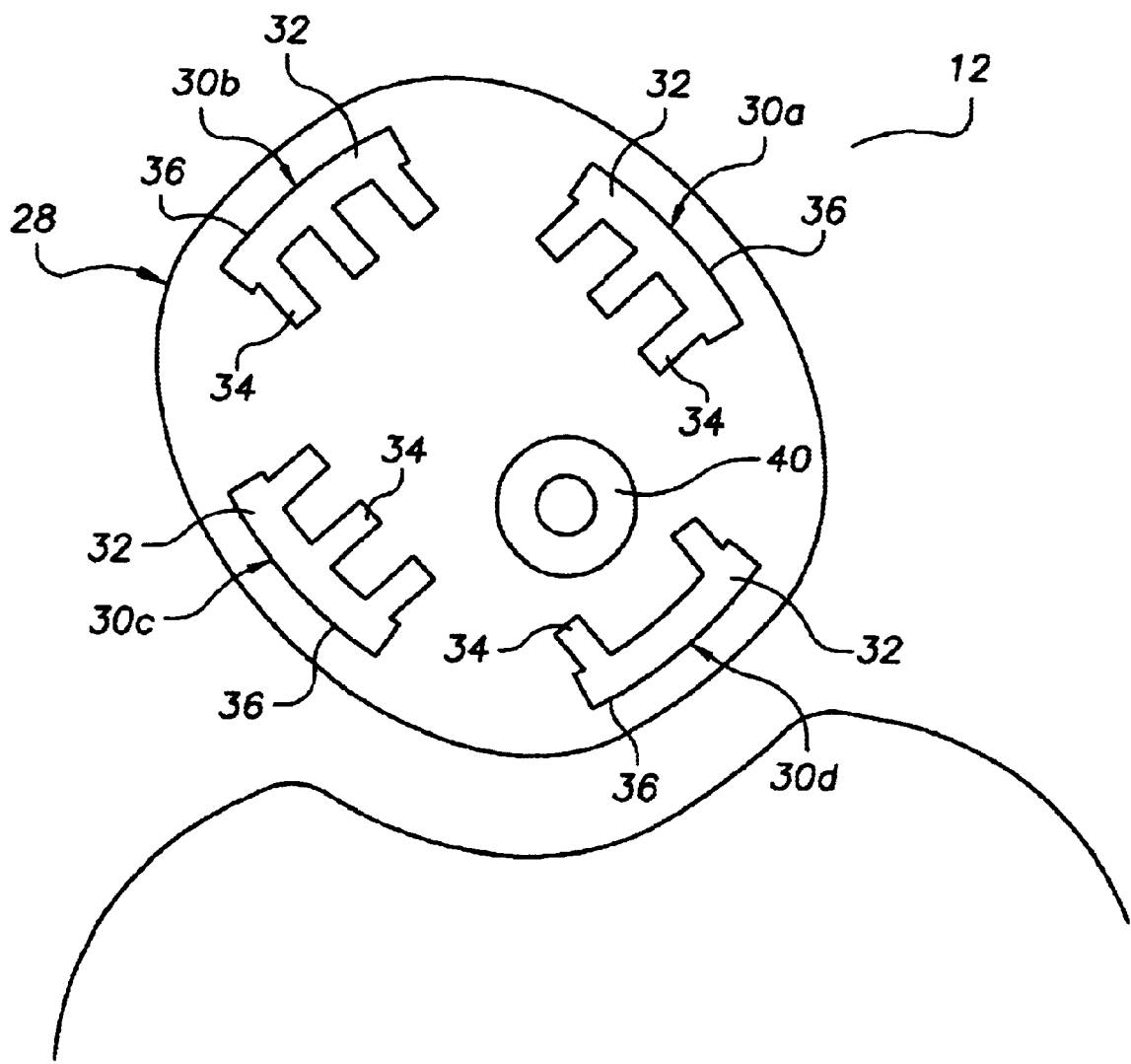
FIG. 4 is a enlarged detailed view of the area identified at circle A of FIG. 3.
Figure 5:
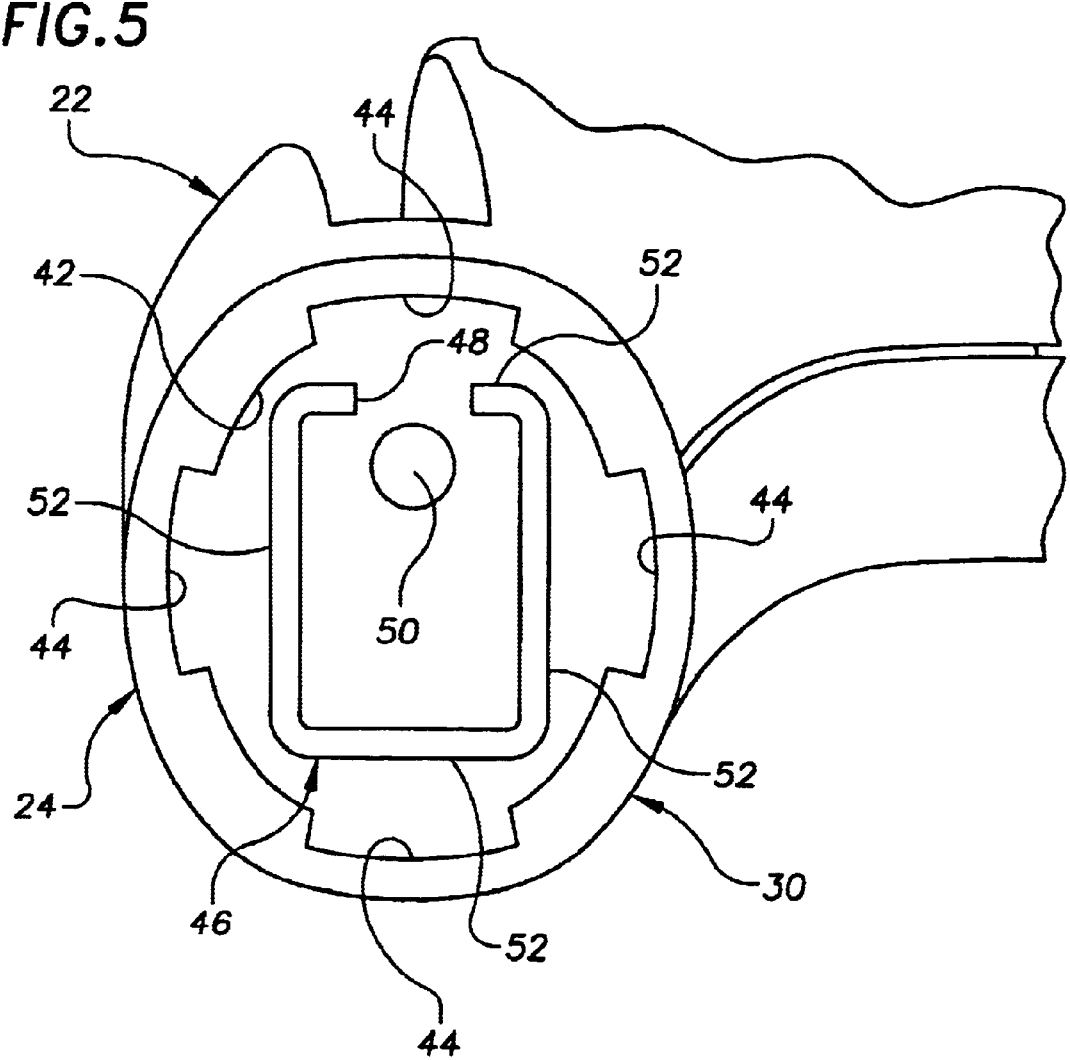
FIG. 5 is an enlarged view of one end of the bail handle.

With initial reference to FIGS. 1 and 2, a power tool embodying the teachings of the present invention is illustrated and generally identified at reference numeral 10. As will become apparent below, the present invention is specifically directed to an arrangement for mounting a handle to a power tool. In the embodiment illustrated, the power tool is a hedge trimmer 10. Those skilled in the art will readily appreciate that the teachings of the present invention are applicable to various other power tools.

The power tool 10 is illustrated to generally include a housing 12. The housing 12 is injection molded of a plastic material and includes left and right halves which are secured with fasteners in a conventional manner. The housing 12 defines a first handle 14 to be grasped by the user. Adjacent the first handle 14 is an opening 16 for receiving a hand of the user.

The power tool 10 further includes a pair of blades shown simplified in the drawings at reference numeral 18. The blades 18 are driven by an electric motor 19 within the housing 12. An angled guard portion 20 is positioned between the blades 18 and the housing 12. In certain applications one blade will be stationary and the other blade will move relative to the stationary blade. In other applications both blades will reciprocate relative to the housing 12.

The power tool 10 is further shown to include a second handle in the form of a bail handle 22. The bail handle 22 is generally U-shaped. While not specifically shown in the drawings, it will be understood that the bail handle 22 is injection molded of a plastic material and includes upper and lower halves having the generally U-shape which are secured with fasteners. Alternatively it will be appreciated that the bail handle 22 may be a unitary piece. The bail handle 22 includes first and second ends 24 secured to the housing 12 in a manner to be discussed below.

With continued reference to FIGS. 1 and 2 and additional reference to FIGS. 3–6, the arrangement of the present invention for securing the bail handle 22 to the housing 12 will be further detailed. A common arrangement is employed for securing both of the ends 24 of the bail handle 22 to corresponding portions of the housing 12. The remainder of this detailed description will be primarily directed to the arrangement used to secure the first end 24 of the bail handle 22 to the housing 12. However, it will be clearly understood that the arrangement for securing the second end 26 to the housing 12 is a mirror image thereof.

Figure 6:
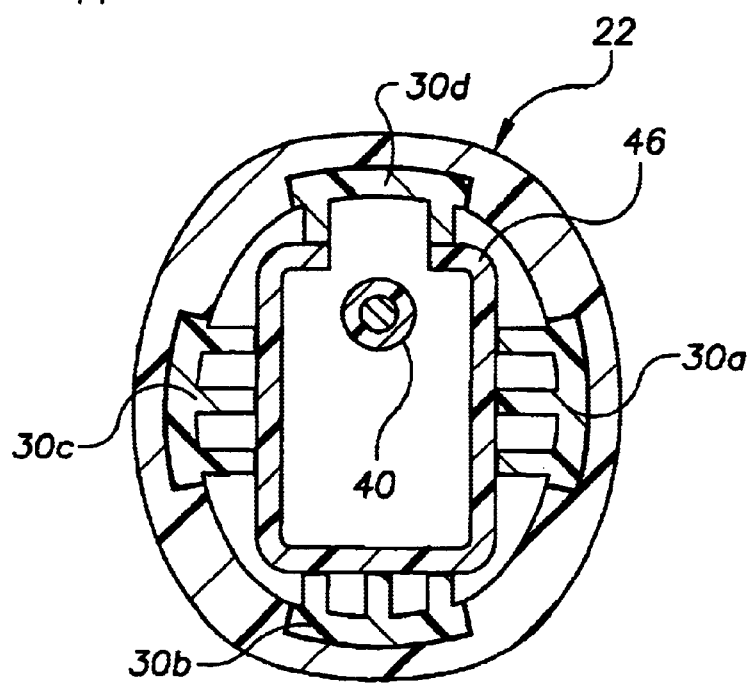
FIG. 6 is a cross-sectional view taken through the cooperating components of the arrangement for mounting a handle to a power tool of the present invention.

The mounting arrangement of the present invention is shown to generally include first and second cooperating portions 28 and 30. The first portion 28 is integrally formed with the housing 12. Motor 19 is positioned between the first mounting portion 28 and the second mounting portion 30 incorporated on the opposing side of the housing 12. Such an arrangement provides improved weight distribution for ease of maneuverability. The second portion 30 is intricately formed with the end 24 of the bail handle 22. The first portion 28 is shown most clearly in FIG. 4. The second portion 30 is shown most clearly in FIG. 5. FIG. 6 is a cross-sectional view illustrating the cooperating nature of the portions 28 and 30.

In the embodiment illustrated, the first portion is shown to include a plurality of projections 30a, 30b, 30c and 30d laterally extending from the housing 12. Each of the projections 30a–30d includes a peripheral segment 32 and a plurality of inwardly directed segments 34. The peripheral segments 32 each have a convexly curved surface 36. Three of the projections 30a–30c are substantially identical and include three inwardly extending segments 34. The remaining projection 30d includes two inwardly extending segments 34. A middle one of the segments 34 otherwise present in the remaining projections 30a–30c is not present in the projection 30d so as to provide clearance for a threaded fastener (not shown) which engages an internally threaded screw boss 40.

The second portion 30 defines an opening 42 having a general oval shape with cooperating recesses 44 for accommodating the projections 30a–30d. Each of the recesses 44 includes an arcuate side and opposed tapered sides which matingly receive the peripheral segment 32 of the associated projections 30a–30d.

The second portion 30 further includes a generally rectangular shaped projection 46 which laterally extends toward the housing 12. The projection 46 includes an opening 48 for accommodating the threaded fastener (again not shown) that is received within the threaded boss 40. The fastener extends through an aperture 50 positioned adjacent the opening 48. It will be understood that a distinct fastener extending a predetermined distance will be employed for each mounting portion so as not to interfere with the motor 19 positioned therebetween. The projection 46 includes four sides 52 sized and oriented to abut the segments 34 of an associated one of the projections 30a–30d.

As is inherent with power tools, vibrational forces are transmitted from a motor 19 and working portion through other portions of the tool such as the handle during operation. This condition may encourage a conventional fastener connecting the handle to the housing to loosen over time. The projections 30a and 30d of the first portion 28 interfit with recesses 44 of the second portion 30 and cooperatively function to further resist relative rotation between the first and second portions 28, 30. Explained further, the cooperating geometries of the first and second portions 28 and 30 discourage movement therebetween which may otherwise be influenced by casual handling of the power tool 10 or vibrational forces associated with operating the power tool 10.

The description of the invention is merely exemplary in nature and, thus, variations that do not depart from the gist of the invention are intended to be within the scope of the invention. Such variations are not to be regarded as a departure from the spirit and scope of the invention. For example the first portion 28 may alternatively be formed with the handle 22 and the second portion 30 formed with the housing 12.

What is claimed is:

1. A power tool comprising:
   a motor within a housing;
   a handle;
   a first mounting portion incorporated on one of said housing and said handle, said first mounting portion including a first plurality of lateral projections extending therefrom; and
   a second mounting portion incorporated on the other of said housing and handle, said second mounting portion including a first plurality of recesses adapted to receive said first plurality of lateral projections;
   a third mounting portion carried by one of the housing and the handle, said third mounting portion including a second plurality of lateral projections extending therefrom
   whereby the first plurality of lateral projections and the first plurality of recesses cooperate to prevent rotation of the handle relative to the housing and said motor is disposed between said first and third mounting portions.

2. The power tool according to claim 1, further including a fourth mounting portion on the other of the housing and the handle, the fourth mounting portion including a second plurality of recesses adapted to receive said second plurality of lateral projections.

3. A power tool comprising:
   a housing having a motor therein, said housing including a first pair of mounting portions; and
   a handle having opposite ends defining a second pair of mounting portions, one of said first and second pairs of mounting portions each including a plurality of recesses arranged thereon for receiving a plurality of projections extending from each of the other of said first and second pairs of mounting portions, said recesses and said projections cooperating to prevent relative rotation between said handle and said housing;
   wherein the mounting portions of said first pair of mounting portions each include a threaded boss incorporated thereon for receiving a fastener.

4. The power tool of claim 3, wherein said first and second pairs of mounting portions are parallel to one another.

5. The power tool of claim 3, wherein the mounting portions of said second pair of mounting portions each include an aperture for receiving a fastener, said fasteners extending through each of said apertures and received by said bosses in a mounted position.

6. The power tool of claim 5, wherein said fasteners are axially aligned along a common axis in said mounted position.

7. A power tool comprising:
   a housing including a motor therein, said housing including a housing mounting portion arranged thereon;
   a handle having an end defining a handle mounting portion; and
   a plurality of recesses arranged on one of said housing and handle mounting portions, said plurality of recesses defining a receiving segment, said plurality of recesses configured to receive a plurality of lateral projections incorporated on the other of said housing and handle mounting portions, said plurality of lateral projections defining an insertion segment, said plurality of recesses and projections adapted to prevent rotation of said handle relative to said housing in a mounted position;
   wherein said plurality of lateral projections include a plurality of peripheral segments.

8. The power tool of claim 7, wherein each of said plurality of peripheral segments include an arcuate contact surface configured on outboard surfaces thereof.

9. The power tool of claim 8, wherein said plurality of recesses include arcuate engaging surfaces adapted to cooperatively engage said arcuate contact surface of said plurality of peripheral segments in said mounted position.

10. The power tool of claim 9, wherein said receiving segment further comprises a projection wall extending therefrom.

11. The power tool of claim 10, wherein said projection wall is generally rectangular shaped.

12. The power tool of claim 11, wherein each of said plurality of peripheral segments include a lateral contact surface configured on inboard surfaces thereof.

13. The power tool of claim 12, wherein said lateral contact surface of each of said plurality of peripheral segments engages said projection wall in said mounted position.

14. A power tool comprising:

a motor within a housing; and a handle having a handle mounting portion, the handle mounting portion connected to a corresponding housing mounting portion, wherein the handle and housing mounting portions are interconnected through a plurality of peripheral recesses on one of said handle and housing mounting portions, said plurality of peripheral recesses cooperating with a plurality of peripheral lateral projections on the other of said handle and housing mounting portions to prevent rotation of the handle relative to the housing;

wherein each peripheral lateral projection includes an arcuate contact surface in engagement with a corresponding arcuate surface of one of the recesses.

15. The power tool of claim 14, wherein each peripheral lateral projection includes at least one inwardly directed projection.

16. The power tool of claim 14, wherein the plurality of lateral projections includes a substantially rectangular projection.

17. The power tool of claim 16, wherein the rectangular projection includes an opening to accommodate a fastener between the handle and the housing mounting portions.

18. A power tool comprising:

a motor within a housing; and a handle having a pair of handle mounting portions, the handle mounting portions connected to a corresponding pair of housing mounting portions to prevent rotation of the handle relative to the housing, wherein the pairs of handle and housing mounting portions are interconnected through a plurality of recesses on one of said handle and housing mounting portions, said plurality of recesses cooperating with a plurality of lateral projections on the other of said handle and housing mounting portions, and wherein the motor is disposed between the housing mounting portions;

wherein the plurality of recesses and the plurality of lateral projections include cooperating peripheral segments.

19. The power tool of claim 18, wherein each of the peripheral segments includes an arcuate surface.

20. A power tool comprising:

a housing having a motor therein, said housing including a first pair of mounting portions; and a handle having opposite ends defining a second pair of mounting portions, one of said first and second pairs of mounting portions each including a plurality of peripheral recesses arranged thereon for receiving a plurality of peripheral projections extending from each of the other of said first and second pairs of mounting portions, said recesses and said projections cooperating to prevent relative rotation between said handle and said housing;

wherein each of the first pair of mounting portions includes a boss thereon for receiving a fastener.

21. The power tool of claim 20, wherein each of the second pair of mounting portions includes an aperture for receiving said fastener.

22. A power tool comprising:

a housing including a first pair of mounting portions;

a motor within the housing disposed between the first mounting portions; and a handle having opposite ends defining a second pair of mounting portions, one of said first and second pairs of mounting portions each including a plurality of recesses arranged thereon for receiving a plurality of projections extending from each of the other of said first and second pairs of mounting portions, said recesses and said projections cooperating to prevent relative rotation between said handle and said housing;

wherein the plurality of recesses and the plurality of projections include cooperating peripheral segments.

23. The power tool of claim 22, further comprising a plurality of inwardly directed projections extending from at least one of the peripheral segments.

24. The power tool of claim 22, wherein the plurality of projections includes a substantially rectangular projection.

* * * * *